Patented Sept. 14, 1948

2,449,418

UNITED STATES PATENT OFFICE 2,449,418

RUBBERY DIOLEFIN POLYMERS CONTAINING PROCESSING AIDS

William Henry Sharkey, Wilmington, Del., assignor to E. I. du Pont de Nemours & Company, Wilmington, Del., a corporation of Delaware No Drawing. Application September 13, 1945, Serial No. 616,151

10 Claims. (Cl. 260—30.8)

This invention relates to synthetic rubber compositions. More particularly this invention relates to synthetic rubber compositions of the butadiene type having improved self tack in the uncured state, which are obtained by incorporating an alpha-(acylthio)carboxylic acid in the synthetic rubber.

One of the problems in utilization of synthetic rubber of the butadiene type is the production of compositions possessing sufficient tackiness for use in manufacturing processes which require such steps as calendering, extruding or plying up of successive layers of the material.

An object of this invention is to provide new synthetic rubber compositions of the butadiene type. A further object is to provide new synthetic rubber compositions of the butadiene type which have improved self tack or adhesion in the uncured state. A further object is to provide a class of compounds which increase the ease of milling of synthetic rubbers of the butadiene type when incorporated therein as well as providing in these rubbers an increased degree of tackiness.

These objects are accomplished by the incorporation with a synthetic rubber of the butadiene type as processing aid therefor of from 0.5 to 10% by weight, based on the weight of the synthetic rubber, of an aliphatic alpha-(acylthio)carboxylic acid.

In the preferred process the alpha-(acylthio)-carboxylic acid is incorporated on a rubber mill or in an internal mixer with the synthetic rubber commercially known as GR–S which is a synthetic rubber-like polymer prepared from a mixture of about 75 parts of 1,3-butadiene and 25 parts of styrene.

The more detailed practice of this invention is illustrated by the following examples in which parts are by weight.

Example I

Twenty parts of a synthetic, rubber-like polymer prepared from a mixture of about 75 parts of 1,3-butadiene and 25 parts of styrene, known commercially as GR–S, is placed on a 6-inch rubber mill heated to 70° C. and the mill is set so that the opening between the rolls is 18 gauge. When the rubber forms a band, 0.8 part (4% by weight based on the synthetic rubber) of alpha-(acylthio)succinic acid.

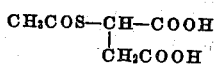

[C. A. 35, 2113 (1941)], is added on the mill and after dispersing the alpha-(acetylthio)succinic acid by the usual blending and mixing technique the rubber is milled for an additional 20 minutes. Thereupon the composition is sheeted from the mill and allowed to cool to room temperature. This stock containing the alpha-(acetylthio)-succinic acid possesses better tack, as evidenced by the readiness with which two pieces of the composition adhere when pressed together, than does GR–S milled for a similar period in the absence of alpha-(acetylthio)succinic acid. Furthermore, the acetylthiosuccinic acid materially improves the mill and compounding characteristics of the rubber.

Example II

Eight tenths part (4% by weight based on the rubber) of acetylthioglycolic acid, $$CH_3COSCH_2COOH$$

is milled as in Example I for twenty minutes with 20 parts of a synthetic rubber-like copolymer prepared from a mixture of about 75 parts of 1,3-butadiene and 25 parts of styrene, known commercially as GR–S. The synthetic rubber is then sheeted from the mill and allowed to cool to room temperature. The rubber composition so prepared exhibits good tack and in this respect is superior to GR–S milled in the absence of the acetylthioglycolic acid.

The compounds which have been found useful for providing butadiene synthetic rubbers with the property of tackiness or self-adhesion in the uncured state are all aliphatic alpha (acylthio)-carboxylic acids having the structure

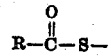

attached to a carbon alpha to a carboxyl group, R being hydrocarbon and preferably lower alkyl. As illustrated by the examples they may contain one or more than one carboxyl group. Especially good results are obtained by the use of alpha-(acylthio)dicarboxylic acids. Other alpha-(acylthio)-dicarboxylic acids, useful in this invention in addition to the succinic acid derivative are the alpha-(acetylthio) adipic acid, alpha-(lauroylthio)succinic acid, alpha - (propionylthio)succinic acid, alpha - (butyrylthio)succinic acid, alpha-methyl-alpha'-(acetylthio)succinic acid, and the like.

As illustrated by Example II alpha-(acylthio)-monocarboxylic acids are also useful in this invention. Other monocarboxylic acids of this type include alpha-(acetylthio)propionic acid, lauroylthioglycolic acid, propionylthioglycolic acid, butyrylthioglycolic acid, alpha-(acetylthio)isobutyric acid, and the like.

The alpha-(thiol)carboxylic acids also are effective as tackifying agents for synthetic rubbers of the butadiene type for example, alpha-thiolsuccinic acid (mercaptosuccinic acid), when milled with GR-S produces a rubber composition having a good degree of self-tack. In some instances the alkyl esters of alpha-(acylthio)carboxylic acids can also be used as tackifiers and milling aids for synthetic rubbers of the butadiene type.

The synthetic rubbers of the butadiene type, or synthetic rubbery high molecular weight conjugated diolefin polymers, for which the above compounds are useful as tackifying agents include those prepared by the polymerization of a material consisting predominantly of a conjugated diene hydrocarbon. Thus the synthetic rubber may be prepared by the polymerization of a conjugated diene hydrocarbon such as butadiene, isoprene, dimethylbutadiene and piperylene, either alone or in admixture with one another or with unsaturated compounds polymerizable with a conjugated diene to yield rubber-like copolymers. As examples of the copolymers may be mentioned those containing major amounts of 1,3-butadiene and minor amounts of styrene, alpha-methylstyrene, 2,5-dichlorostyrene, vinylnaphthalene, acrylonitrile, methyl methacrylate, 2-vinylpyridine, dimethyl (vinylethinyl) carbinol, and the like. Of these, the synthetic rubber hydrocarbon polymers, containing a major proportion of the hydrocarbon diene constituents such as 75:25 butadiene/styrene copolymers (GR-S) are preferred, since improvements in milling characteristics and tack are most marked with these butadiene/styrene elastomers when treated in accordance with this invention.

The alpha-(acylthio)carboxylic acids are incorporated with the synthetic rubbers in the proportions of from 0.5 to 10% by weight based on the rubber to accomplish the purposes of this invention. Below 0.5% by weight, the rubbers do not show sufficient improvement in self-tack and above 10% excessive tack may result and adverse effects on the tensile strength after curing may occur. In these properties the alpha-(acylthio)carboxylic acids also act as milling aids to reduce milling time of the synthetic rubbers necessary to give smooth coherent stocks of improved compounding properties.

The incorporation of the alpha-(acylthio)carboxylic acids with the synthetic rubber may be carried out by any desired method as by adding the modifier to the synthetic rubber while the rubber is being worked on a roll mill or by masticating a mixture of the rubber and the agent in an internal mixer such as a Banbury type mixer.

Any of the compounding ingredients ordinarily used for synthetic rubber such as pigments, fillers, vulcanizing agents, age resistors, and other modifying materials, as well as natural rubber or other resinous materials may be employed as desired in the compositions herein described.

The foregoing detailed description has been given for clearness of understanding only. No unnecessary limitations are to be understood therefrom for obvious modifications of the exact details shown and described will occur to a person skilled in the art.

What is claimed is:

1. A composition of matter comprising a synthetic, rubbery, high molecular weight, conjugated diolefin polymer wherein the conjugated diolefin is present in major amount together with from 0.5 to 10%, by weight of said polymer, of an aliphatic alpha-(acylthio)carboxylic acid.

2. The process for improving the processing characteristics of a synthetic, rubbery, high molecular weight, conjugated diolefin polymer wherein the conjugated diolefin is present in major amount which comprises incorporating with said polymer by a mixing operation from 0.5 to 10% by weight of an aliphatic alpha-(acylthio)carboxylic acid.

3. An unvulcanized synthetic, rubbery, high molecular weight, conjugated diolefin polymer having a conjugated diolefin present in major amount and having incorporated therein from 0.5 to 10%, by weight of said polymer, of an aliphatic alpha-(acylthio)carboxylic acid.

4. A vulcanizable rubber composition comprising a synthetic, rubbery, high molecular weight, conjugated diolefin polymer wherein the conjugated diolefin is present in major amount and, as a tackifier therefor, from 0.5 to 10%, by weight of said polymer, of an aliphatic alpha-(acylthio)carboxylic acid.

5. A rubbery composition of improved tackiness comprising a rubbery butadiene-styrene polymer and from 0.5 to 10%, by weight of said polymer, of an aliphatic alpha-(acylthio)carboxylic acid.

6. A rubbery composition of improved tackiness comprising a rubbery butadiene-styrene polymer and from 0.5 to 10%, by weight of said polymer, of an aliphatic alpha-(acylthio)dicarboxylic acid.

7. A rubbery composition of improved tackiness comprising a rubbery butadiene-styrene polymer and from 0.5 to 10%, by weight of said polymer, of an aliphatic alpha-(acylthio)monocarboxylic acid.

8. A rubbery composition of improved tackiness comprising a rubbery butadiene-styrene polymer and from 0.5 to 10%, by weight of said polymer, of acetylthiosuccinic acid.

9. A rubbery composition of improved tackiness comprising a rubbery butadiene-styrene polymer and from 0.5 to 10%, by weight of said polymer, of acetylthioglycolic acid.

10. A composition comprising a synthetic rubbery, high molecular weight, conjugated diolefin polymer wherein said conjugated diolefin is present in major amount together with from 0.5 to 10%, by weight of said polymer, of an aliphatic alpha-mercapto carboxylic acid.

WILLIAM HENRY SHARKEY.

REFERENCES CITED

The following references are of record in the file of this patent:

UNITED STATES PATENTS

| Number | Name | Date |
|---|---|---|
| 2,363,618 | Patrick | Nov. 28, 1944 |
| 2,422,246 | Lazier et al. | June 17, 1947 |

Certificate of Correction

Patent No. 2,449,418. September 14, 1948.

WILLIAM HENRY SHARKEY

It is hereby certified that error appears in the printed specification of the above numbered patent requiring correction as follows:

Column 3, line 24, after the word "with" insert *other*;

and that the said Letters Patent should be read with this correction therein that the same may conform to the record of the case in the Patent Office.

Signed and sealed this 1st day of March, A. D. 1949.

[SEAL]

THOMAS F. MURPHY,
*Assistant Commissioner of Patents.*